UNITED STATES PATENT OFFICE.

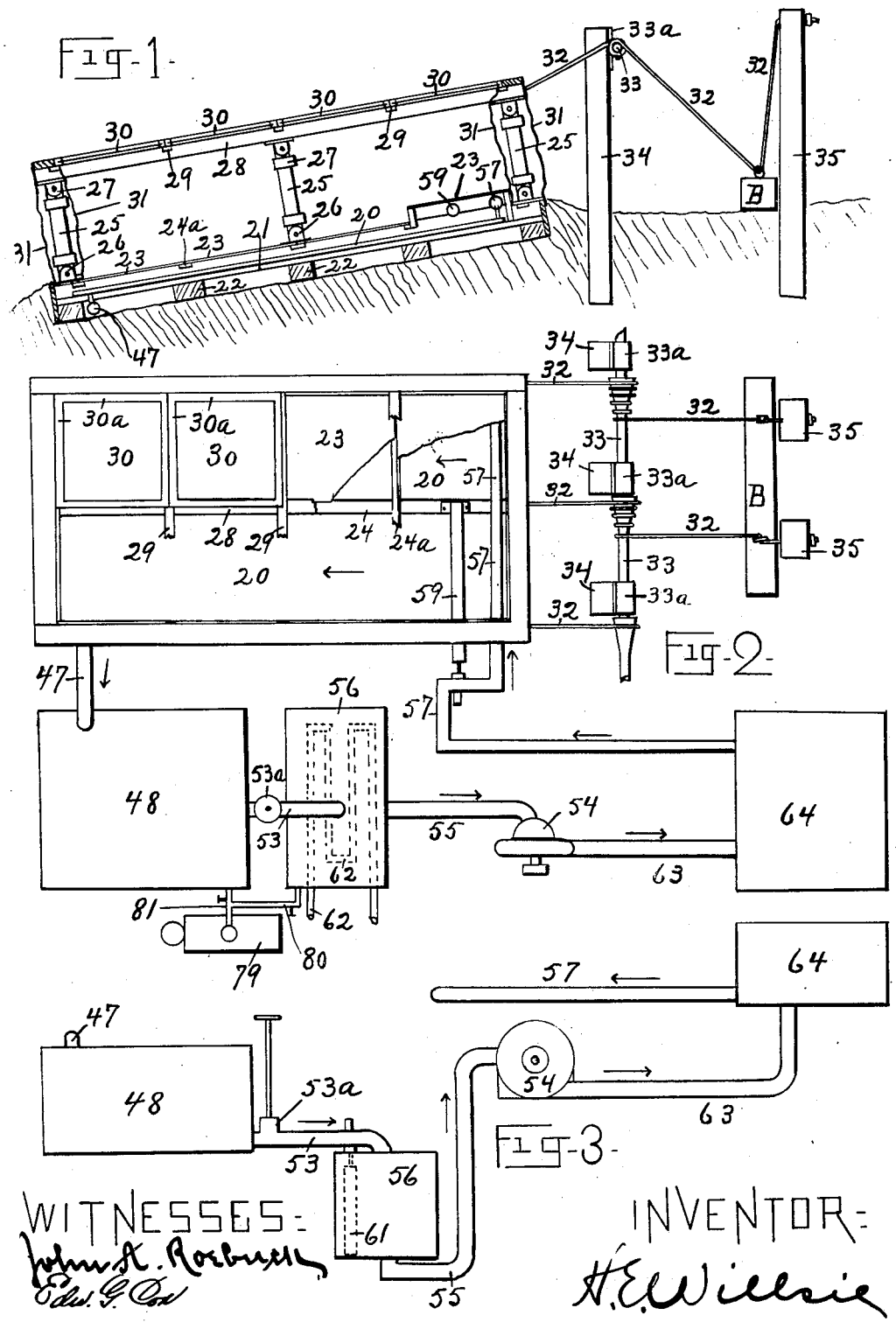

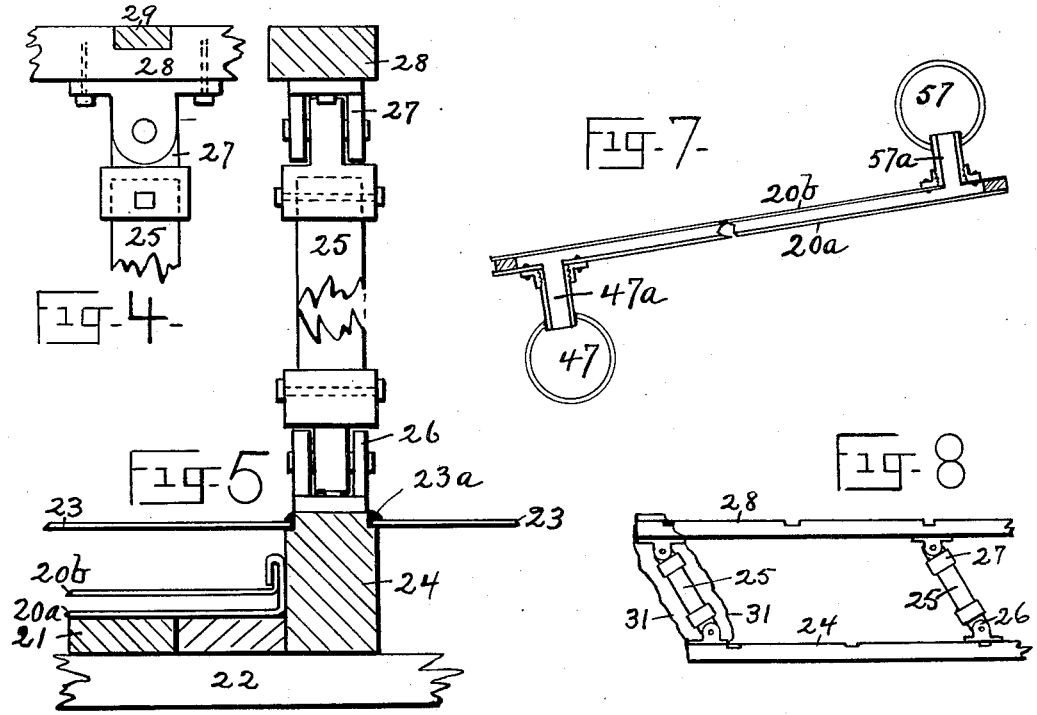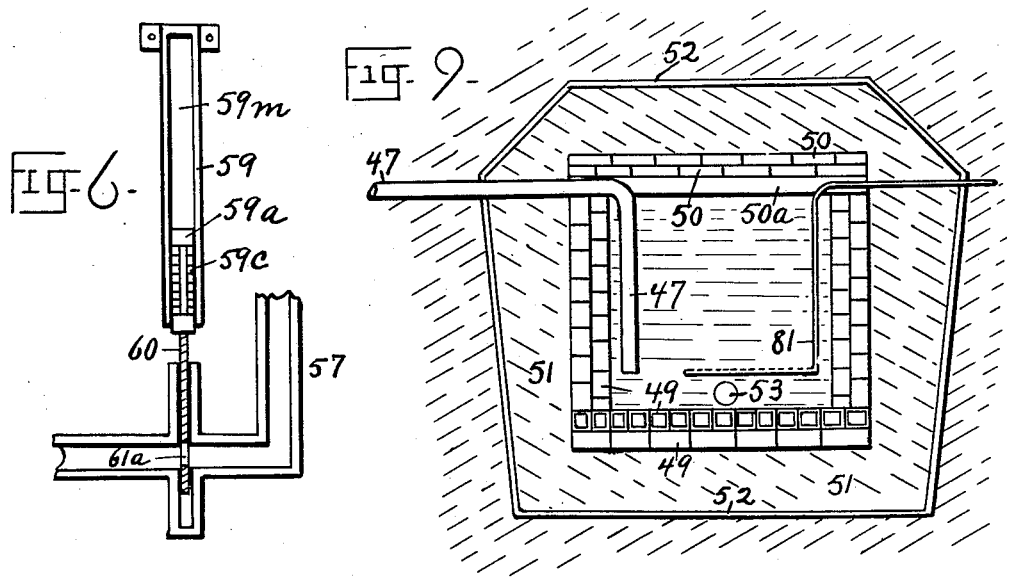

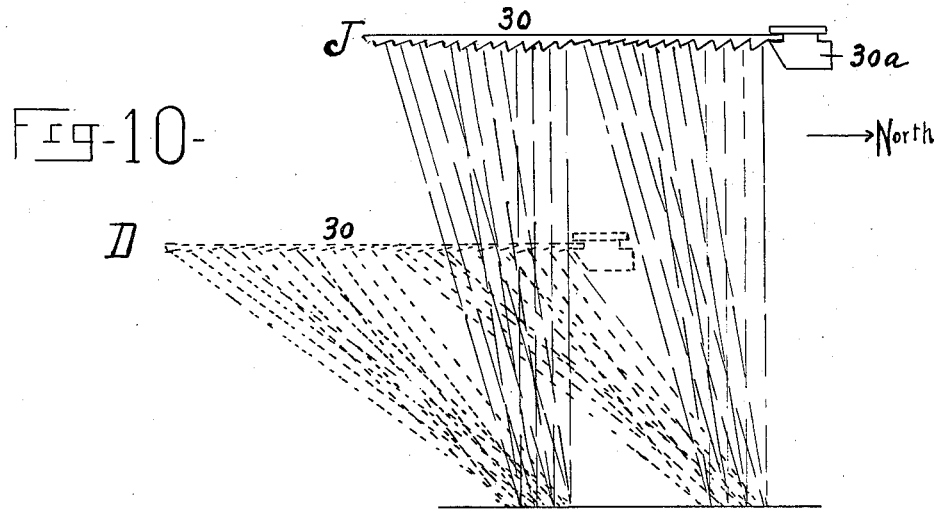
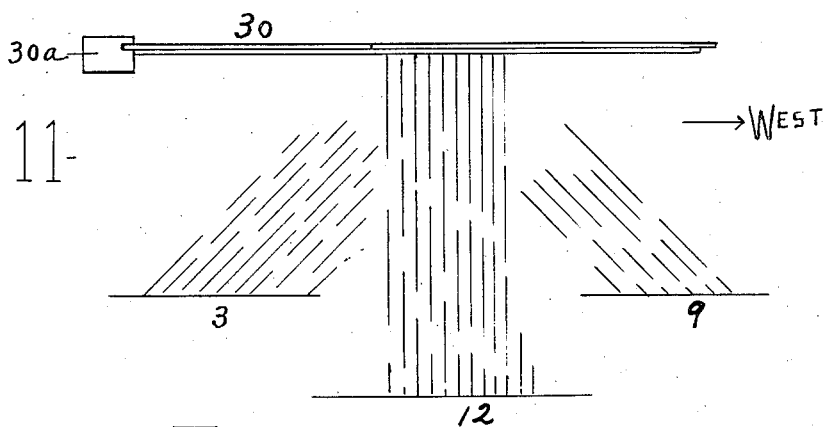
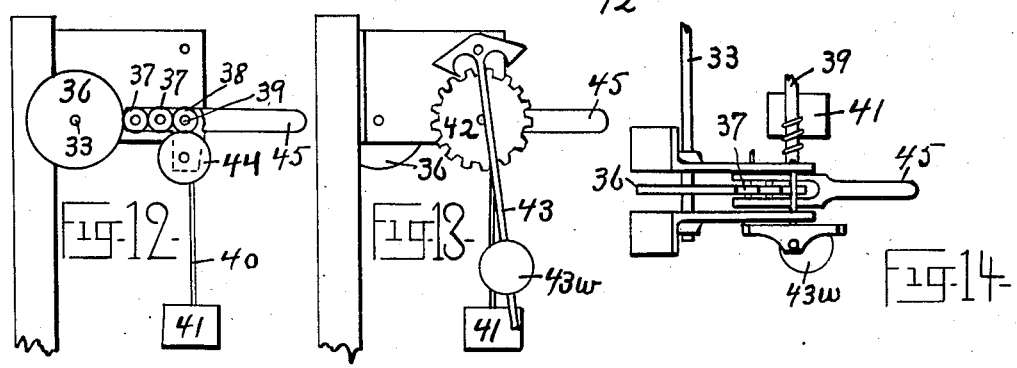

HENRY ELMER WILLSIE, OF NEW YORK, N. Y.

SOLAR APPARATUS.

1,130,871.  Specification of Letters Patent.  Patented Mar. 9, 1915.

Application filed June 3, 1904. Serial No. 210,943.

*To all whom it may concern:*

Be it known that I, HENRY ELMER WILLSIE, a citizen of the United States, and a resident of New York, in the county of New York and State of New York, have invented certain new and useful Improvements in Solar Apparatus, of which the following is a specification.

My invention relates to improvements in solar apparatus in which heat from the sun is collected and stored by a circulated liquid.

The objects of my invention are, to provide means for concentrating the sun's rays, for circulating a liquid to absorb the heat of the rays, for storing the solar heated liquid, and for regulating the concentrating and circulating devices. I attain these objects by the devices shown in the accompanying drawing, in which:

Figure 1 is a vertical section of the solar heat receiving compartment and of the balancing device; Fig. 2, a diagrammatical plan view of the apparatus, with a part of the receiving compartment broken away to show the construction; Fig. 3, an elevation diagram of the tanks and the pipe connections; Fig. 4, a side view of the pivot of a support; Fig. 5, a view of the support and portions of the heater; Fig. 6, a sectional view of the regulator of the water flow; Fig. 7, a vertical section of a water heating trough; Fig. 8, a side view of the inclined position of the supports of the heat receiving compartment; Fig. 9, a vertical section of the storage reservoir; Fig. 10, a vertical cross section through the prism glass; Fig. 11, a vertical longitudinal section through the prism glass; Fig. 12, a vertical view of the reversing gears in the focusing device clock work; Fig. 13, a vertical view of the pendulum in the focusing device; Fig. 14, a plan view of the focusing device clock work.

Similar characters refer to similar parts throughout the several views.

In the solar heat receiving compartment the liquid holding sheet iron troughs 20, 20 supported by the planks 21, 21 and the beams 22, 22 are covered by sheets of glass 23, 23, supported by the beams 24, 24, and the cross braces 24ª, 24ª. To these beams are attached the wooden supports 25, 25, by means of the cast iron pivots 26, 26; and by means of the cast iron pivots 27, 27, these supports are attached to the beams 28, 28, in which are mortised the cross beams 29, 29. The beams 28, 28 and 29, 29 support sheets of glass 30, 30, secured in sashes 30ª 30ª. The troughs, as shown in Figs. 5 and 7, are made by securing rather close together two sheets of metal, 20ª and 20ᵇ. The sides of the lower sheet 20ª are bent up and folded over the upper sheet 20ᵇ to make a closed joint. Each trough is connected at its upper end to the distributing pipe 57 by a short pipe 57ª; and at its lower end to the collecting pipe 47 by a short pipe 47ª. Except these openings into the short pipes the troughs form closed water tight containers. The sides of the heat receiving compartment are inclosed by double walls 31, 31, of flexible material, as canvas, sheet rubber, or leather. The heat receiving compartments should be made tight enough to prevent the escape of air. One way to do this is indicated by the application of the asphalt cement 23ª to the edges of the glass 23.

The sheets of glass, 30, 30, are cast or rolled with prism ridges on one side, preferably on the under side. These prism ridges are formed with different angles so that the solar heat and light rays passing through the glass are brought to a focal line. This prism glass thus differs from the prism glass now in common use for refracting light into rooms. Fig. 10 shows a sheet of glass formed of two series of prisms so that there are two lines of focus. It is evident that there may be one or more series of prisms in one sheet of glass; that the prisms may be either on the upper or lower or on both sides of the glass sheet; that separate prisms, or smaller sheets of glass with the same refractive angle, may be attached together, or secured in a frame, to secure the same result; and that the refracting surfaces of each prism may be curved instead of plane. For brevity I refer to such constructions as line focusing lenses. As the object of the prism glass in this apparatus is to concentrate the solar heat rays upon the troughs 20, 20, to obtain higher temperatures than can be obtained with plane glass the focal line need not be sharp, and may have a width of from less than one inch to more than four inches. The sharpness and the positions of the focal lines will vary with the apparent motion of the sun. As shown in Fig. 11, the focal line at 9 a. m. will be at the level 9, at noon at the level 12, and at 3 p. m. at the level 3. As the level of the focal lines, or their distance above a predetermined plane as the troughs 20, 20, would vary with the seasons and the time of day the prism glass is raised or lowered so as to always have the focal lines upon the troughs. For instance, as shown in Fig. 10, the prism glass which would be in the position J in June at noon would be lowered to the position D in December at noon. And in June the prism glass would be in the position D once in the forenoon and once in the afternoon. The distance between the prism glass and the troughs is regulated by the clockwork shown in Figs. 12, 13 and 14. The cables 32, 32, are secured to the beams 28, 28 and to the shaft 33. The shaft 33 is attached by the bearings 33$^a$, 33$^a$ to the posts 34, 34. The cables 32, 32 are also attached to the balancing weight B and their ends secured to the posts 35, 35. The gear wheel 36 secured to the shaft 33 is driven through train of gears 37, 37 by the gear 38 which is secured to the shaft 39. Attached to the shaft 39 and wound around it is the rope 40, which supports the weight 41. The escapement wheel 42 is secured to the shaft 39 and the pendulum 43 regulates its motion in the usual manner. The reversing gear 44 and the gears 37, 37 are pivoted in the forks of the lever 45 which is pivoted on the shaft 39. To illustrate the operation of these devices Fig. 1 may be assumed to show the position of the prism glass at noon in June. The clock work operating through the shaft 33 and the cables 32, 32 lowers the prism glass so that by 2 p. m. it may be in the position shown in Fig. 8. Thus as the afternoon sun would raise the focal lines the clock work lowers the prism glass so as to keep the focal lines upon the troughs. In the forenoon the gear 44 is thrown into mesh and the prism glass is raised until noon, when the gears 37, 37 are again thrown into mesh. In December at noon the prism glass will have its lowest noon position. Fig. 8 may also be taken to show the relative position of the prism glass at noon in March and in September. Thus as the daily movement of the prism glass is less in the winter months than in the summer months the clockwork is regulated by means of the pendulum weight 43$^w$ to run slower in winter than in summer. The position of the pendulum weight should be changed slightly each day. By means of this movement of the glass cover the amount of shadow, that would otherwise be thrown on the bottoms of the troughs, is reduced and consequently the amount of heat received is increased. It is generally understood that in constructions like solar heaters the heat from the sun readily passes through the glass cover in the form of luminous rays which are changed by the substances within the heater into obscure rays that can not readily pass back through the glass. Thus there is effected an accumulation of heat within the heater, providing the insulation is sufficient and the heat is not withdrawn. The temperature, but not the quantity, of such an accumulation is increased if the glass cover is a lens focusing the rays upon some substance within the heater.

It is evident that the troughs 20, 20 may extend lengthwise east and west, instead of north and south as shown, and that the widths of the troughs then need not greatly exceed the widths of the lines of focus.

The water in the troughs 20, 20 flows into the pipe 47 and through it into the storage reservoir 48. The construction of this reservoir should be such as to retain the heat in the water. In the construction shown in Fig. 9 hollow glazed building blocks 49, 49 are cemented together to form a liquid holding reservoir. The top is closed by planks, 50, 50, supported by beams, as 50$^a$. Surrounding this reservoir is dry sand, ashes, or gravel, 51, which is surrounded by the casing 52 made of asphalt or cement. This water tight casing 52 keeps moisture from the sand 51. The reservoir and casing have openings for the admission of pipes. By opening the valve 53$^a$ in the pipe 53, which connects the reservoir 48 with the vaporizing chamber 56, the heated water may flow over the vaporizing pipes 62 and give up heat to sulfur dioxid, or ammonia, contained in the vaporizing pipes, and the vapor pressure thus obtained may be transformed into motion by a suitable motor. Or the heat may be used for other purposes, such as distilling sea water or sugar solutions, or for drying fruit. The liquid used is preferably water or a solution of calcium chlorid in water.

The bottom of the vaporizing chamber 56 is connected by the pipe 55, the centrifugal pump 54, and the pipe 63 to the tank 64, which may be of the same construction as the reservoir 48. The pump 54, operated by a motor not shown, takes water from the vaporizing chamber and delivers it into the tank 64. This tank is connected to the pipe 57, so that the cooled water may flow into the troughs 20, 20 to be reheated.

To regulate the amount of water flowing through the troughs 20, 20 according to the temperature of the heat receiving compartment a regulator is provided. This consists of a tube 59 within which is a piston 59ª, with the packing 59ᶜ. The tube is filled with mercury 59ᵐ. To the piston 59ª is secured the valve 60 with the opening 61ª. In operation, as the temperature in the receiving compartment increases the mercury expands, pushes out the piston which more or less opens the valve and thus allows more water to flow into the troughs. A lowering of the temperature in the heat receiving compartment reverses the operation so that no water is permitted to flow through the troughs when the sun is not shining. To regulate the amount of water flowing into the vaporizing chamber in order to maintain a given temperature therein a regulating valve is provided, shown as 61, of similar construction but with the opening 60ª so adjusted in relation to the pipe 53 that a lowering of the temperature permits more heated water to flow into the vaporizing chamber.

For long periods with little sunshine the auxiliary boiler 79 is provided. This boiler may be any one of the well known types of steam boilers heated by the combustion of fuel. The steam from this boiler exhausts through the pipe 80 into the vaporizing chamber 56, or through the pipe 81 into the reservoir 48. Thus in case of necessity the steam may be exhausted continuously into the reservoir and the heat stored in the water until it is needed in the vaporizing chamber.

My invention is not restricted to the precise construction and arrangement shown. It may be modified and rearranged without departing from the spirit of the invention.

Having now described my invention what I claim and desire to secure by Letters Patent, is:

1. In a solar apparatus, the combination of a liquid container, line focusing lenses, means for adjusting said lenses upon said liquid container, a reservoir connected to said container and adapted to store liquid heated in said container, and auxiliary means adapted to put heat from the combustion of fuel into said reservoir.

2. In a solar apparatus, the combination of a liquid container, line focusing lenses, means for adjusting the focus of said lenses upon said liquid container, a reservoir connected to said container and adapted to store liquid heated in said container, and thermostatic means for regulating the flow of liquid from said reservoir.

3. In a solar apparatus, the combination with a solar heater adapted to heat a fluid circulated therein, a pump for circulating the fluid through said heater, thermostatic means for regulating the flow of fluid through said heater, and auxiliary means for heating said fluid by the combustion of fuel.

4. In a solar apparatus, the combination of a liquid container, line focusing lenses, means for adjusting the focus of said lenses upon said liquid container, a reservoir connected to said container adapted to store liquid heated in said container, and means adapted to circulate a liquid through said container and said reservoir.

5. In a solar apparatus, a series of liquid containers inclosed in a compartment with a heat retaining bottom, flexible sides and a prism glass cover, said containers being provided with inlets and outlets for liquid.

6. A solar heater provided with a cover consisting of a series of line focusing lenses adapted to focus solar rays upon substances within said heater secured to parallel supports having a parallel motion for the focusing of said lenses.

7. In a solar heater, a series of prisms adapted to concentrate bands of solar rays upon substances within said heater, supports for said prisms having a parallel motion, and a time controlled mechanism adapted to regulate said parallel motion.

8. In a solar apparatus, a series of fluid holding receptacles with heat retaining sides and bottoms and transparent covers adapted to permit sunshine to heat the contained fluid, a transverse distributing container connected to said receptacles and adapted to flow fluid into said receptacles, and a transverse collecting container connected to said receptacles and adapted to receive the heated fluid from said receptacles.

9. In a solar apparatus, a solar heat receiving compartment inclosed by heat retaining sides and bottom and by a series of line focusing lenses adapted to focus solar rays upon substances within said compartment, adjustable supports for said lenses, and means for adjusting the foci of said lenses.

10. In a solar apparatus, a series of liquid holding troughs inclosed in a compartment having a heat retaining bottom, flexible sides and a cover of line focusing lenses secured to supports provided with a parallel motion, said troughs having inlets and outlets for liquid.

11. In a solar apparatus, a liquid holding trough inclosed in a compartment having a heat retaining bottom, flexible sides and a cover of line focusing lenses secured to supports provided with a parallel motion, said troughs having an inlet and an outlet for liquid.

12. In a solar apparatus, the combination of a solar heater, a storage reservoir for solar heated liquid, pipe connections between said heater and said reservoir, a pump for circulating a liquid through said heater and said reservoir, and thermostatic means for regulating the quantity of liquid flowing through said heater according to the temperature of the heater.

13. In a solar apparatus, a solar heat receiving compartment, a reservoir for the storage of solar heated liquid, a passage for liquid between said compartment and said reservoir, a chamber wherein heat is taken from the solar heated liquid, a passage for liquid between said reservoir and said chamber, a passage for liquid between said chamber and said compartment, means for regulating the flow of liquid in said compartment, means for regulating the flow of liquid into said chamber and means for circulating said liquid.

14. In a solar apparatus, a solar heat receiving compartment, a reservoir for the storage of solar heated liquid, a passage for liquid between said compartment and said reservoir, a chamber wherein heat is taken from the solar heated liquid, a passage for liquid from said reservoir into said chamber, a tank for storing the liquid from which the heat has been taken, a passage for liquid between said chamber and said tank, a passage for liquid between said tank and said compartment and means for circulating said liquid.

15. In a solar apparatus, a solar heat receiving compartment, a reservoir for the storage of solar heated liquid, a passage for liquid between said compartment and said reservoir, a chamber wherein heat is taken from the solar heated liquid, a passage for liquid from said reservoir into said chamber, a tank for storing the liquid from which the heat has been taken, passages for liquid between said chamber and said tank and between said tank and said compartment, means for regulating the flow of liquid into said compartment, means for regulating the flow of liquid into said chamber, and means for circulating said liquid.

16. In a solar apparatus, a solar heat receiving compartment, a reservoir for the storage of solar heated liquid, a passage for liquid between said compartment and said reservoir, a chamber wherein heat is taken from the solar heated liquid, a passage for the liquid between the said reservoir and the said chamber, a tank for storing the liquid from which heat has been taken, passages for the liquid between said chamber and said tank and said compartment, a pump for transferring the liquid from said chamber to said tank, a thermostatic valve for regulating the flow of liquid from said tank into said compartment and an automatic valve for regulating the flow of liquid from said reservoir into said chamber.

17. In a solar apparatus, a solar heat receiving compartment, a reservoir for the storage of solar heated liquid, a passage for liquid between said compartment and said reservoir, a chamber wherein heat is taken from the solar heated liquid, a passage for liquid between said reservoir and said chamber, a passage for liquid between said chamber and said compartment, means for circulating said liquid and an auxiliary steam boiler heated by the combustion of fuel connected by steam pipes to said reservoir and to said chamber.

18. In a solar apparatus, a solar heat receiving compartment, a reservoir for the storage of solar heated liquid, a passage for liquid between said compartment and said reservoir, a chamber wherein heat is taken from said solar heated liquid, a passage for liquid between said reservoir and said chamber, a passage for liquid between said chamber and said compartment, a pump and means for operating it adapted to circulate said liquid through said reservoir, chamber, compartment and passages, and auxiliary means for introducing heat from fuel combustion into said chamber.

19. In a solar apparatus, a solar heat receiving compartment, a reservoir for the storage of solar heated liquid, a chamber wherein heat is taken from said solar heated liquid, passages for liquid connecting said reservoir, compartment and chamber in a cycle, a pump and means for operating it adapted to circulate said liquid through said reservoir, chamber, compartment and passages, and auxiliary means for heating said liquid by the combustion of fuel.

20. In a solar apparatus, a series of fluid holding receptacles with heat retaining sides and bottoms and transparent covers adapted to permit sunshine to heat the contained fluid, a pump connected to said receptacles adapted to circulate a fluid through said receptacles, and means for regulating the flow of fluid through said receptacles according to the temperature therein.

21. In a solar apparatus, a series of fluid holding inclined troughs provided with transparent covers adapted to permit sunshine to heat a contained fluid, said troughs being connected near the top of the incline and near the bottom of the incline with transverse fluid holding troughs, and mechanical means adapted to aid the circulation of fluid through said troughs.

22. In a solar apparatus, the combination of a reservoir adapted to contain a solar heated liquid, a flatly extended liquid holding receptacle, adapted to expose a liquid to solar heat and adapted to flow by gravity a contained liquid, said reservoir and said receptacle being in communication, and a pump connected and adapted to supplement said gravity flow and to complete the circulation of liquid through said receptacle and said reservoir.

23. In a solar apparatus, the combination of a flatly extended liquid holding receptacle adapted to expose a contained liquid to solar heat, said liquid being inclined so as to flow the liquid through it by gravity, and a pump adapted and connected to return the liquid to the top of the inclined receptacle.

Signed at New York in the county of New York and State of New York this 25th day of May A. D. 1904.

HENRY ELMER WILLSIE.

Witnesses:
    WALTER COX,
    EDW. G. COX.